United States Patent [19]

Berger

[11] Patent Number: 5,050,395
[45] Date of Patent: Sep. 24, 1991

[54] METHOD OF SWITCHING AN AIR CONDITIONER OF A MOTOR VEHICLE

[75] Inventor: Joachim Berger, Winterbach, Fed. Rep. of Germany

[73] Assignee: Robert Bosch GmbH, Stuttgart, Fed. Rep. of Germany

[21] Appl. No.: 516,724

[22] Filed: Apr. 30, 1990

[30] Foreign Application Priority Data

May 2, 1989 [DE] Fed. Rep. of Germany ....... 3914445

[51] Int. Cl.$^5$ .............................................. B60H 1/32
[52] U.S. Cl. ........................................ 62/133; 62/158; 62/230; 62/243; 62/323.4
[58] Field of Search ................... 62/133, 158, 323.4, 62/323.1, 243, 244, 230; 123/198 R

[56] References Cited

U.S. PATENT DOCUMENTS

| 4,155,225 | 5/1979 | Upchurch, Jr. ................. | 62/133 |
| 4,206,613 | 6/1980 | Shockley ....................... | 62/133 |
| 4,219,000 | 8/1980 | Locher et al. .................. | 123/357 |
| 4,357,920 | 11/1982 | Stumpp et al. ................. | 123/446 |
| 4,510,764 | 4/1985 | Suzuki .......................... | 62/243 |
| 4,658,943 | 4/1987 | Nishikawa et al. ............. | 62/133 X |
| 4,688,530 | 8/1987 | Nishikawa et al. ............. | 62/323.4 |
| 4,823,555 | 4/1989 | Ohkumo ........................ | 62/133 |

Primary Examiner—Harry B. Tanner
Attorney, Agent, or Firm—Walter Ottesen

[57] ABSTRACT

The switching on and switching off of an air conditioner is primarily determined by signals which are supplied by a temperature controller. However, operating conditions are present wherein the temperature controller supplies the signal "on" but that the operation of the air conditioner is nonetheless unwanted so that the torque of the engine can be available for driving the vehicle. The fulfillment of special conditions for switching off and again switching on the air conditioner are therefore investigated when temperature switch-on conditions are fulfilled. According to the method of the invention, the air conditioner is switched off when the accelerator pedal position exceeds a switch-off threshold value and the difference between the actual permissible full-load quantity and the actual correct idle quantity is less than a predetermined minimum difference. The air conditioner is again switched on when either the accelerator pedal position lies below a switch-on threshold value for at least a predetermined time duration or when the engine speed exceeds an rpm threshold value.

7 Claims, 1 Drawing Sheet

METHOD OF SWITCHING AN AIR CONDITIONER OF A MOTOR VEHICLE

FIELD OF THE INVENTION

The invention relates to a method for switching an air conditioner of a motor vehicle having an internal combustion engine. The air conditioner of the vehicle is switched by means of special conditions after a switch-on signal is already supplied by the temperature controller.

BACKGROUND OF THE INVENTION

An engine control arrangement is known wherein the air conditioner is controlled such that the air conditioner is switched on by a temperature regulator and is again switched off as soon as the special condition of "full throttle" begins. More precisely, this special condition is only adequate for switching off if the vehicle is equipped with an automatic transmission. For a vehicle having manually-shifted transmission, the special condition "full throttle" leads to a switch-off of the air conditioner when, in addition, the special condition is fulfilled that the first gear is engaged.

It is further known to increase the power output of the engine in advance of switching the air conditioner into operation. A method for this purpose is disclosed in patent application Ser. No. 477,887 filed in the United States Patent and Trademark Office on Apr. 12, 1990. Even when applying this method, the switch-on of the air conditioner is entirely omitted when the engine is driven at full load.

In all known methods, after the air conditioner has been switched off because of the fulfillment of special conditions, the air conditioner is again switched on as soon as the special conditions are no longer satisfied.

SUMMARY OF THE INVENTION

In view of the foregoing, it nonetheless remains desirable to configure the method of switching an air conditioner so that the air conditioner is not driven in time intervals in which the torque supplied by the engine should be made available as much as possible for driving the vehicle even though the temperature control supplies an "on" signal.

The method of the invention is directed to special conditions for switching off as well as to such conditions for again switching on an air conditioner. With reference to switching off, the condition is of special significance that the difference between the actual permissible full-load quantity and the actual correct no-load quantity lies below a threshold value. If this difference is above the threshold value, then the air conditioner can always be operated. In contrast, if there is a drop below the threshold and the accelerator pedal position at the same time exceeds a switch-off threshold value, the air conditioner switched on via the temperature control is switched off. It is then intended that the entire fuel quantity is available for acceleration. The air conditioner is preferably not switched off immediately if one of these two special conditions is no longer fulfilled and instead, only when the accelerator pedal position lies below a switch-on threshold value for a predetermined time or if the rotational speed exceeds an rpm threshold value.

All of the switch-off and switch-on conditions can be applied conjointly as well as individually.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
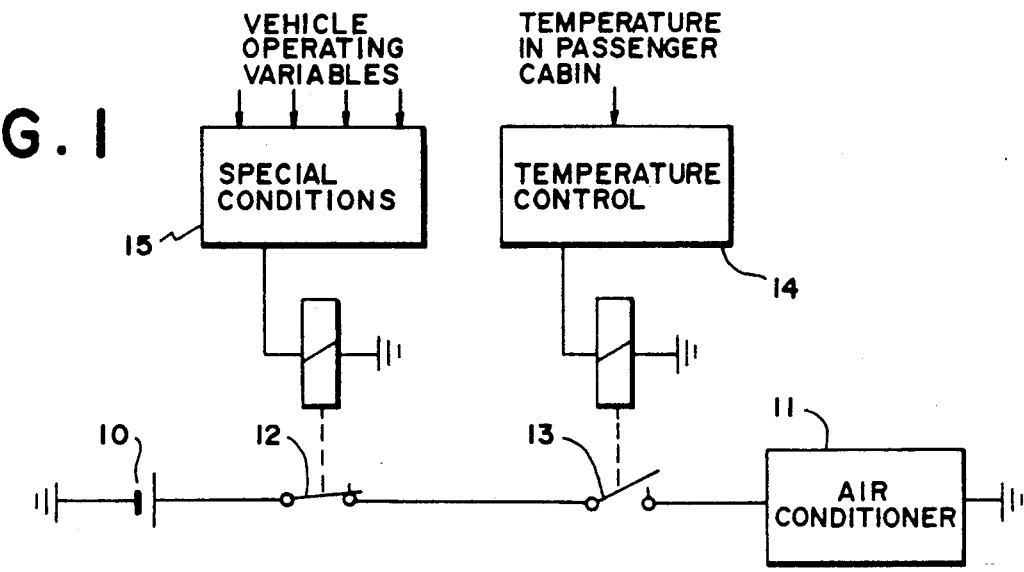
FIG. 1 is a block diagram of an air conditioner control arrangement.

The circuit block diagram of FIG. 1 includes a special-condition switch 12 and a temperature controller switch 13 connected between a battery 10 and an air conditioner 11. The special-condition switch 12 is mostly closed. The air conditioner 11 is switched on and switched off only by means of the temperature controller switch 13. The switch 13 is controlled by a temperature controller 14 which is supplied with a signal indicative of the temperature in the passenger cabin and compares this temperature with a desired temperature. The special-condition switch 12 is actuated by a special-condition determination arrangement 15 to which vehicle operating variables are supplied.

The embodiment of the invention as to how the special-condition determination unit 15 forms switch-on and switch-off signals from these vehicle operational variables is explained with reference to FIG. 2.

Figure 2:
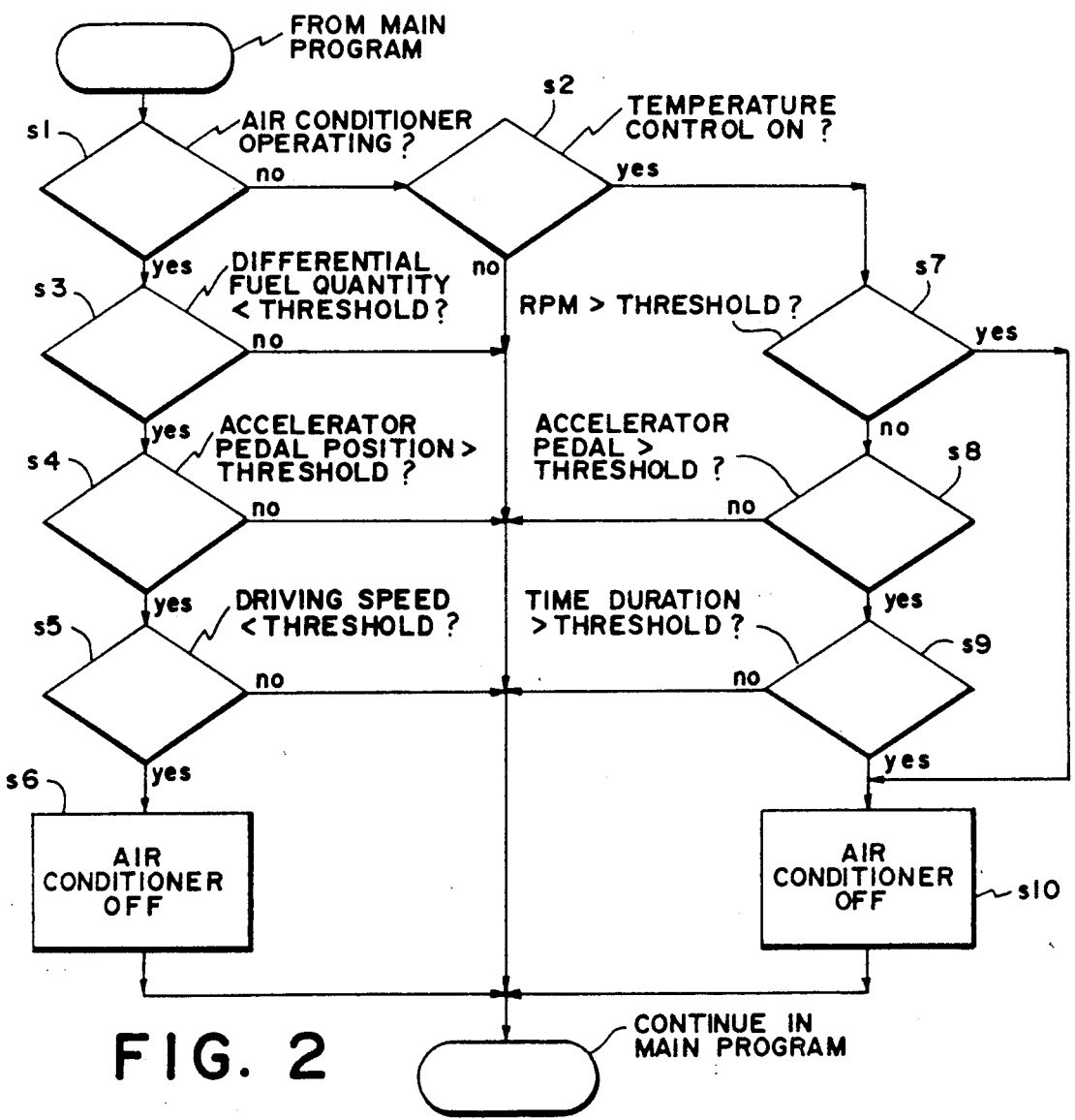
FIG. 2 is a flowchart for explaining an embodiment of the method of the invention for switching off and switching on an air conditioner in dependence upon special conditions being fulfilled.

The method sequence according to FIG. 2 is carried out by means of a computer program which is called up within a main program. In step s1, a determination is made as to whether the air conditioner is operating. If this is not the case, then a determination is made in step s2 as to whether the temperature controller has supplied the signal "on" to switch on the air conditioner. If this is not the case, then the main program is processed further.

However, if a determination is made in step s1 that the air conditioner is operating, then a determination is made in sequence steps s3 to s5 whether special conditions are fulfilled which lead to a switch-off of the air conditioner. In step s3, the difference is determined between a first quantity of fuel which is permissible under full load for the actual operating conditions and that quantity of fuel which applies for the actual operating conditions at no-load (idle). The permissible full-load quantity is especially dependent upon air pressure. At high elevations, a considerably lower quantity of fuel may be injected than when driving at sea level if the mixture is not to become overenriched. The actual proper idle quantity is dependent especially upon the temperature and rpm of the engine. Over a certain threshold rpm such as 1200 rpm, the no-load quantity is zero independent of further conditions. In actual idle, the quantity of fuel for a 2.4 liter, six cylinder diesel engine is approximately 5 mg per stroke for a warm engine and approximately 10 mg per stroke for a cold engine. The full-load quantity when driving at sea level is approximately 25 mg per stroke.

If the above-mentioned difference lies above a predetermined minimum difference, the air conditioner can in any event continue to operate. No further conditions are then investigated. The main program can then continue to be processed. The minimum difference in the above example amounts to 50% of the full-load quantity.

If there is a drop below the minimum difference in step s3, then a determination is made in step s4 as to whether the accelerator pedal position lies above a switch-off threshold value. In the embodiment described, this threshold value is 60% of the maximum displacement path. If the accelerator pedal position lies below this threshold value, then the air conditioner can in any event continue to be operated. The subprogram according to FIG. 2 is then terminated and the main program is processed further.

If however a determination is made in step s4 that the switch-off threshold value for the accelerator pedal position is exceeded, then a determination is made in step s5 as to whether the vehicle speed lies below a predetermined threshold. For a vehicle with manually-shifted transmission, this threshold speed is 20 km/h in the embodiment; whereas, this threshold speed is 40 km/h for a vehicle with automatic transmission. If the speed lies above this threshold speed, then the air conditioner can continue to operate. The subprogram according to FIG. 2 is terminated and the main program is processed further.

If however the condition according to step s5 is also fulfilled, then the air conditioner is switched off in step s6. The main program is processed further until step s1 is again reached. It is determined that the air conditioner is not operating and for this reason the step s2 is reached as initially described. A determination is made that the temperature controller supplies the signal "on". Since the air conditioner, however, is not operating as determined in step s1, this can only mean that for an earlier program passthrough, the special conditions according to the steps s3 to s5 were fulfilled so that the air conditioner was switched off in step s6 because the special conditions were fulfilled. It then remains to be determined whether the air conditioner can again be switched on. This takes place in steps s7 to s9.

In step s7, a determination is made as to whether the rpm threshold value is exceeded. In the embodiment, this value is 2,000 rpm/minute. If this value is exceeded, then the air conditioner can be immediately switched on again and this takes place in step s10. The main program is processed further after this step.

If it develops in step s8 that the accelerator pedal position has dropped below the switch-on threshold value, then a determination is made in step s9 as to whether this condition is fulfilled for at least a predetermined time interval. The time interval in the embodiment is 2 seconds. This time interval avoids a switch-on of the air conditioner immediately followed by a switch-off thereof when the condition according to step s8 is fulfilled only for a short time for the reason that for a vehicle equipped with manually-shifted transmission the operator of the vehicle will let up on the accelerator pedal during the shifting operation. Essentially, the condition should be avoided that a short-time let up on the accelerator pedal causes a short term switch-on of the air conditioner independent of the type of transmission. If however, the predetermined time interval is exceeded, the air conditioner is switched on via step s10.

The embodiment described above can be varied in many ways. Accordingly, it is especially possible to use the above-mentioned switch-off conditions but use other switch-on conditions or vice versa. For the switch-on conditions, the teachings of the state of the art can be utilized, namely, that a switch-on condition is then always present if the switch-off conditions are no longer fulfilled.

In lieu of all three conditions pursuant to steps s3 to s5 for switching off the air conditioner, only the conditions according to steps s3 and s4 or steps s4 and s5 can be utilized. All these variations distinguish from the state of the art in that not only simply the accelerator pedal position determination according to step s4 is carried out, but rather, that the switch-off condition is improved. The conditions which are preferably used depend greatly on which variables are measured and computed. Accordingly, for most motor vehicles equipped with a diesel engine, the driving speed is measured so that the condition according to step s5 can be also considered without difficulty. For vehicles equipped with a gasoline engine, it is at the present time still an exception to measure the driving speed. For this reason, the conditions according to steps s3 and s4 have to be adequate as switch-off conditions.

It is understood that the foregoing description is that of the preferred embodiments of the invention and that various changes and modifications may be made thereto without departing from the spirit and scope of the invention as defined in the appended claims.

What is claimed is:

1. A method for switching on an air conditioner of a vehicle having an internal combustion engine in dependence upon special conditions when a temperature switch-on condition is fulfilled for the air conditioner, the method comprising the steps of:

computing the difference between the actual permissible full-load fuel quantity of the engine and the actual available no-load fuel quantity of the engine;

determining the actual accelerator pedal position; and, switching off the air conditioner when said difference is less than a predetermined minimal difference and said pedal position simultaneously exceeds a switch-off threshold value.

2. The method of claim 1, said difference being less than said predetermined minimal difference defining a first condition and said pedal position exceeding said switch-off threshold value defining a second condition; and, in addition to said first and second conditions, and for triggering the switch-off of the air conditioner, the method comprises the further steps of:

determining whether, as a third condition, the driving speed of the vehicle lies below a threshold speed; and, switching off the air conditioner when all three conditions are fulfilled.

3. The method of claim 2, further comprising the steps of:

determining whether the air conditioner has been switched off by said conditions being fulfilled;

determining the actual position of the accelerator pedal; and, after the air conditioner has been switched off by said conditions being fulfilled, again switching the air conditioner on when the pedal position remains below a switch-on threshold value for at least a predetermined time interval.

4. The method of claim 3, further comprising the steps of:

determining if the air conditioner has been switched off because said special conditions had been fulfilled;

determining the actual rotational speed of the engine; and, after the air conditioner has been switched off by said special conditions being fulfilled, again switching on the air conditioner when the rotational speed exceeds a rotational speed threshold value.

5. The method of claim 2, further comprising the steps of:

determining if the air conditioner has been switched off because said special conditions had been fulfilled;

determining the actual rotational speed of the engine; and, after the air conditioner has been switched off by said special conditions being fulfilled, again switching on the air conditioner when the rotational speed exceeds a rotational speed threshold value.

6. The method of claim 1, said difference being less than said predetermined minimal difference defining a first condition and said pedal position exceeding said switch-off threshold value defining a second condition; and the method comprises the further steps of:

determining whether the air conditioner has been switched off by said conditions being fulfilled;

determining the actual position of the accelerator pedal; and, after the air conditioner has been switched off by said conditions being fulfilled, again switching the air conditioner on when the pedal position remains below a switch-on threshold value for at least a predetermined time interval.

7. The method of claim 1, said difference being less than said predetermined minimal difference defining a first condition and said pedal position exceeding said switch-off threshold value defining a second condition; and the method comprises the further steps of:

determining if the air conditioner has been switched off because said special conditions had been fulfilled;

determining the actual rotational speed of the engine; and, after the air conditioner has been switched off by said special conditions being fulfilled, again switching on the air conditioner when the rotational speed exceeds a rotational speed threshold value.

* * * * *